Patented May 6, 1924.

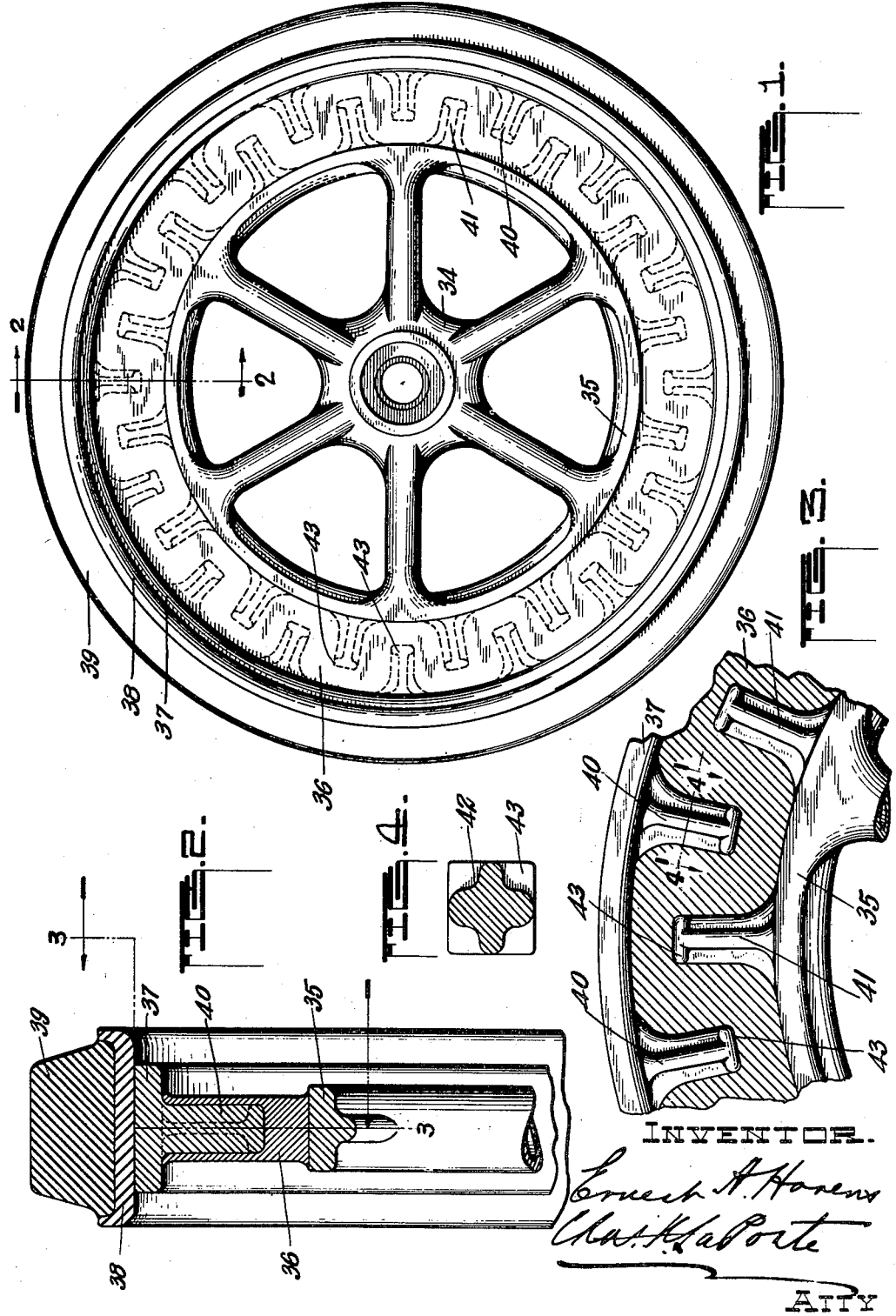

1,493,199

UNITED STATES PATENT OFFICE.

ERNEST A. HAVENS, OF PEORIA, ILLINOIS, ASSIGNOR OF ONE-FOURTH TO FRANK P. CASEY, ONE-FOURTH TO HERMAN H. ASHENBERG, BOTH OF PEORIA, ILLINOIS, AND ONE-FOURTH TO NORMAN T. NICHOLS, OF NEW CANTON, ILLINOIS.

RESILIENT WHEEL.

Original application filed October 28, 1922, Serial No. 597,529. Divided and this application filed November 2, 1923. Serial No. 672,236.

*To all whom it may concern:*

Be it known that I, ERNEST A. HAVENS, a citizen of the United States, a resident of Peoria, in the county of Peoria and State of Illinois, have invented new and useful Improvements in Resilient Wheels, of which the following is a specification.

This invention has reference to wheels and it has for its principal object to improve the construction of wheels used on automobiles and trucks.

A further object of the invention is to provide a hub structure for a resilient wheel, wherein the hub structure has a suspended connection with the tire supporting element of the wheel, such connection preferably comprising india-rubber vulcanized to elements included in the hub structure and the tire supporting element.

This application is a division of the application filed by me on October 28, 1922, for improvements in resilient wheels bearing Serial No. 597,529.

That the invention may be more fully understood, reference is had to the accompanying drawings forming a part of the present description, illustrating a preferred embodiment of the invention, in which:—

Figure 1 is a greatly reduced side elevation of a wheel embodying my invention, being preferably of a type used on trucks;

Figure 2 is a sectional detail as the same would appear if taken on the line 2—2 Figure 1;

Figure 3 is a detail in side elevation, partly in section, as the same would appear if taken on the line 3—3 Figure 2;

Figure 4 is a sectional detail as the same would appear if taken on the line 4—4, Figure 3.

Like characters of reference denote corresponding parts throughout the figures.

The structure described in my original application bearing Serial No. 597,529 is best suited to automobile wheels, such as are intended for use on passenger cars and light vehicles used in commercial work, but for heavy trucks I prefer the structure herein disclosed. In this form, the hub structure preferably comprises a hub structure 34 which includes a felly 35 which may or may not be of the pressed steel type of wheel, and to the peripheral surface of the felly 35 is vulcanized an annular concentric ring of india-rubber 36 and said ring 36 is also vulcanized to the inner surface of a felly 37 forming a part of or connected to an annular concentric rim 38 to which may be secured or attached a solid rubber tire 39 or a pneumatic tire, not shown, if desired. In this instance, as in my original application, the elastic element 36 is the means for suspending one part of the structure from another, except that in this instance the resilient means in the structure is located on the wheel next adjacent the tire supporting means and the resilient medium is preferably unprotected by side plates, such as described in my original application.

A plurality of spaced inwardly extending and radially disposed fingers 40 are connected to the felly 37 and a plurality of spaced outwardly extending and radially disposed fingers 41 are connected to the felly 35. The fingers 40 stop short of the felly 35 and the fingers 41 stop short of the felly 37 and each of such fingers are preferably of less width than the width of the felly 35, whereas the rubber 36 is approximately the width of the felly 35 and embraces and is vulcanized to the fingers 40 and 41, In this respect the structure last described differs from that described in my original application. I also prefer to give the fingers a cross-sectional shape so that they appear with flutes or channels 42, see Figure 4 terminating in an enlarged head 43. This lends added strength to the fingers and a better gripping surface for the vulcanized rubber. As shown in Figure 1 the fingers 40 and 41 are alternately disposed in the rubber, or staggered in a manner similar to the arrangement of the fingers in my original application. Also the action of the rubber 36 when strains or jars are applied to the wheel is substantially the same as that in my original application.

What I claim is:—

1. In a wheel of the character described, in combination, a tire ring, a felly within and connected to said ring and provided with inwardly extending radially disposed fingers, a hub structure for said wheel comprising a wheel like member having an axle receiving hub and a felly and provided with outwardly extending radially disposed fingers arranged alternately to and overlapping the aforementioned fingers, and a suspension means between the felly of the ring and said hub structure including rubber vulcanized to the felly of the ring and the felly of the hub structure.

2. In a wheel of the character described, in combination, a tire ring, a felly within and connected to said ring and provided with inwardly extending fluted radially disposed fingers, a hub structure for said wheel comprising a wheel like member having an axle receiving hub and a felly and provided with outwardly extending radially disposed fluted fingers arranged alternately with the aforementioned fingers, and a suspension rubber filling between said felly of the ring and said hub structure and embracing said fingers and vulcanized thereto and said felly and ring.

3. In a wheel of the character described, in combination, a tire ring and tire thereon, a hub structure for said wheel comprising a wheel like member having an axle receiving hub and a felly spaced therefrom and connected thereto and also spaced from said tire ring, said felly of the hub being spaced at a greater distance from its hub than from the tire ring, means for suspending the wheel like member from the tire ring including a rubber filling connecting the member to said tire ring, and reinforcing fingers connected to said ring and felly and embedded in said rubber, the fingers of ring and felly being alternately disposed and overlapping each other.

In witness whereof, I have hereunto affixed my hand this 27th day of October, 1923.

ERNEST A. HAVENS.